United States Patent [19]

Andres et al.

[11] Patent Number: 4,623,166

[45] Date of Patent: Nov. 18, 1986

[54] HEAD RESTRAINT IN A MOTOR CAR

[75] Inventors: Rudolf Andres, Sindelfingen; Wolfgang Fussnegger, Herrenberg; Helmut Grantz; Werner Heiss, both of Sindelfingen, all of Fed. Rep. of Germany

[73] Assignee: Daimler-Benz Aktiengesellschaft, Stuttgart, Fed. Rep. of Germany

[21] Appl. No.: 649,181

[22] Filed: Sep. 10, 1984

[30] Foreign Application Priority Data

Sep. 10, 1983 [DE] Fed. Rep. of Germany ....... 3332730

[51] Int. Cl.[4] .............................................. B60R 21/10
[52] U.S. Cl. ..................................... 280/751; 297/403
[58] Field of Search ............... 280/751, 748; 297/391, 297/403, 408, 409

[56] References Cited

U.S. PATENT DOCUMENTS

| 2,740,467 | 4/1956 | Page | 297/409 |
| 3,170,725 | 2/1965 | Komorowski | 297/403 |
| 3,174,799 | 3/1965 | Haltenberger | 297/403 |
| 3,883,155 | 5/1975 | Renner et al. | 280/751 |
| 4,033,623 | 7/1977 | Thary et al. | 280/751 |
| 4,249,754 | 2/1981 | Best | 280/751 |
| 4,335,918 | 6/1982 | Cunningham | 280/751 |

FOREIGN PATENT DOCUMENTS

| 1680254 | 9/1971 | Fed. Rep. of Germany . |
| 3020558 | 12/1981 | Fed. Rep. of Germany . |
| 2132479 | 7/1984 | United Kingdom . |

*Primary Examiner*—Richard A. Bertsch
*Attorney, Agent, or Firm*—Barnes & Thornburg

[57] ABSTRACT

A head restraint for a vehicle, which in its stowage position is received by a hollow in the rear window shelf of the vehicle and which can be transferred, together with its bearing arms, into an operational position near to the backrest, the bearing arms being supported on the vehicle side on an inside wall of the hollow, so that, in the stowage position, both the head restraint and its bearing arms rest in the hollow. Before, during or after a swinging operation, the head restraint is pivoted in the opposite direction to the swing of the bearing arms, so that employment in a confined space is possible.

10 Claims, 5 Drawing Figures

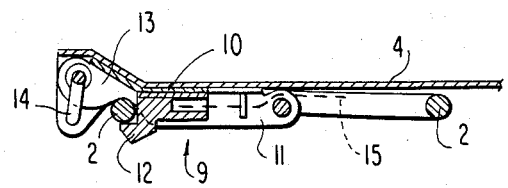
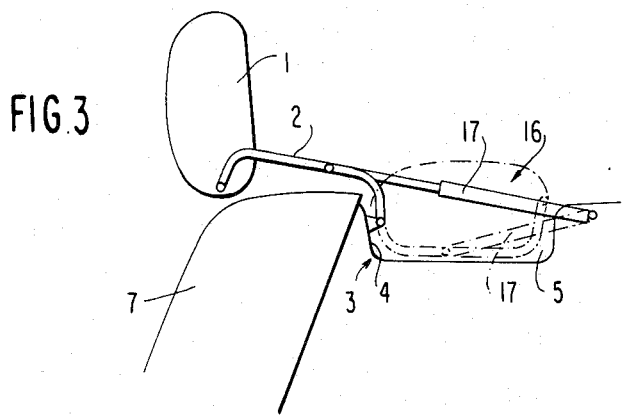
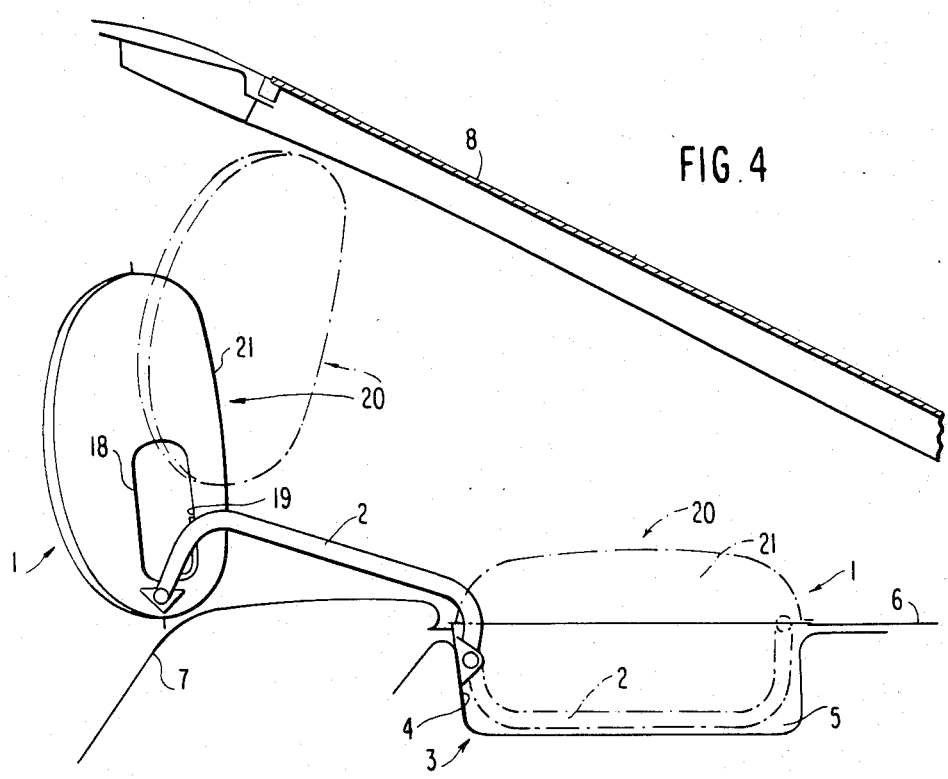

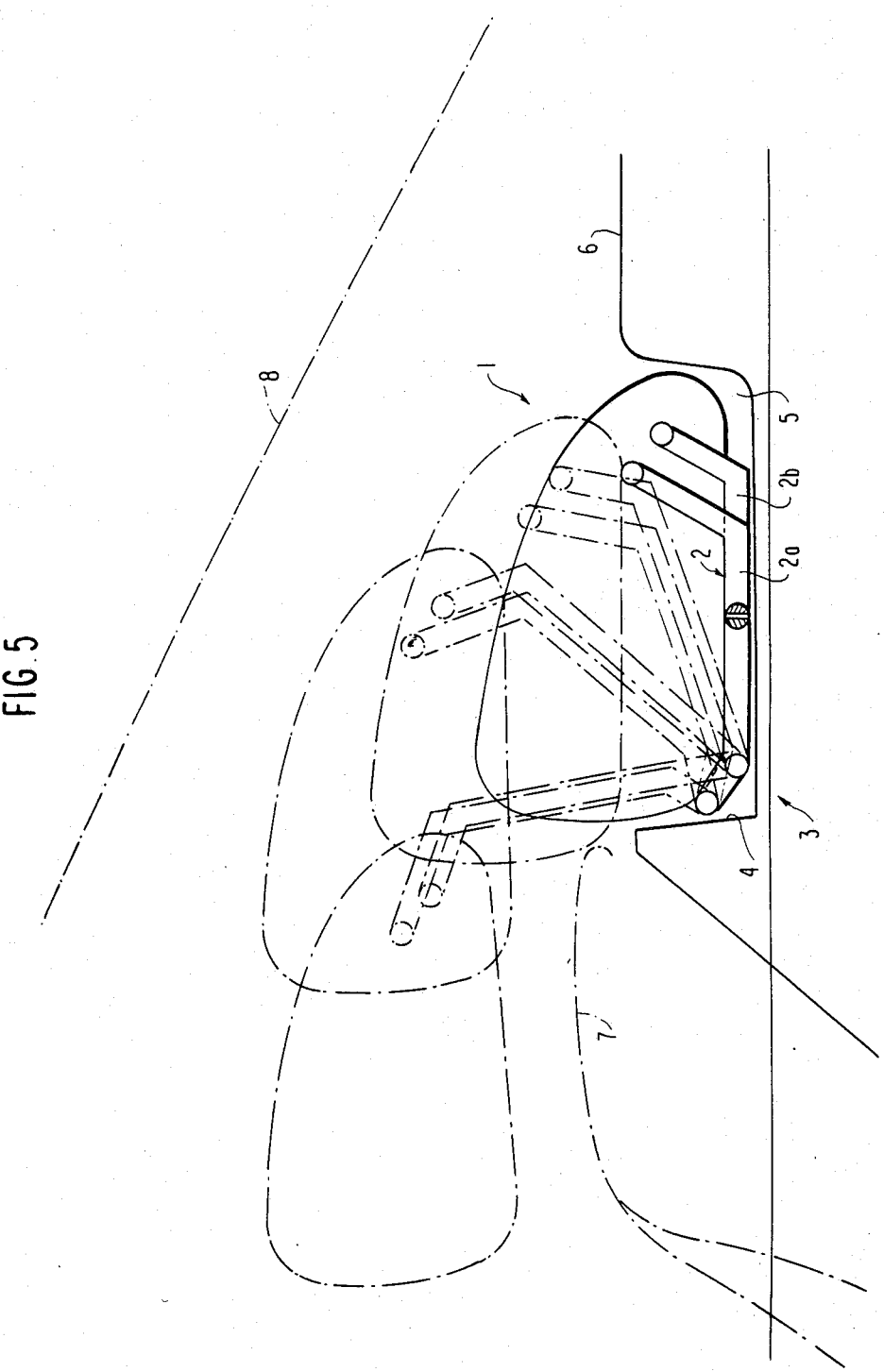

HEAD RESTRAINT IN A MOTOR CAR

The invention relates to a head restraint in a motor car, which is supported by means of at least one bearing arm on a solid part of the vehicle and which, together with the bearing arms, can be transferred from an in-use position into a stowage position, in which the head restraint is received by a hollow in the rear window shelf.

A head restraint in such an arrangement is known from German Offenlegungsschrift No. 3,020,558, wherein the bearing arms are mounted in the direct vicinity of the backrest in order that a position for use is achieved to comply with requirements. A disadvantage here is that a large amount of space is required to carry out this swinging movement, which is not available in particular when an extremely inclined rear window extending beyond the rear backrest is used.

Moreover, the bearing arms protruding above the rear window shelf when the head restraint is pivoted back are unsightly.

It is an object of the invention to provide an improved head restraint apparatus for motor vehicles.

It is a further object of the invention to provide an improved head restraint apparatus for motor vehicles which is power assisted.

It is another object of the invention to provide an improved head restraint apparatus for motor vehicles occupying a minimum space for use in vehicles having inclined rear windows.

An object of the invention is to provide a swinging mechanism for a head restraint which can be used even with an extremely inclined rear window and which does not make the head restraint pivoted back have an unsightly appearance. Therefore, a head restraint is proposed, wherein, according to the invention, an inside wall of the hollow serves as a solid part of the vehicle for supporting the bearing arms and wherein, before, during or after conclusion of a swinging operation, the head restraint is in each case pivoted in the opposite direction to the swing of the bearing arms.

A further object of the invention is the provision of a head restraint admitting the possibility of pre-assembly and of retrofitting if the hollow is designed as a separate component which can be joined to the rear window shelf.

In order to transmit forces occurring into the solid part of the vehicle without the risk of injury to passengers, one exemplary embodiment of the invention provides a mechanism which induces an automatic interlock of at least one bearing arm when the position for use is reached.

According to the invention, in order to be able to achieve a head restraint position felt to be particularly comfortable for various different passengers, it is expedient if, starting from the position for use, the head restraint can be pivoted back to a limited extent by means of a link plate guided in a slot, pivoted and accommodating the bearing arm interlock. In another exemplary embodiment of the invention, a basic head restraint element is provided, having a stop to restrict the backward pivoting movement of the head restraint relative to the bearing arms. In this case, it is possible to dispense with a special interlock of the bearing arms if the head restraint is supported against the rear window in the event of it swinging back due to an accident.

A particularly good appearance is achieved if the rear of the head restraint is designed as a cover closing off the hollow. In this case, the surface finish can be made to match that of the rest of the rear window shelf.

The swinging operation of the head restraint can be carried out simply and also by remote control, if the swinging movement is aided by a power-assisted mechanism, e.g., in the form of a pneumatic spring.

Rattling noises when the head restraint is lowered are avoided if, when the not-in-use position of the head restraint is reached, the pneumatic spring assumes an over dead-center position which can preferably be actuated and, equally, cancelled again by remote control.

A pivoting of the head restraint in the opposite direction to the swing of the bearing arms is achieved if the bearing arms are articulated in pairs and in the manner of a parallelogram.

The foregoing and other objects, features, and advantages of the present invention will become more apparent from the following description when taken in connection with the accompanying drawings which show, for the purposes of illustration only, plural embodiments in accordance with the present invention, and wherein:

FIG. 2 shows a section along the line II—II in FIG. 1;

FIG. 3 shows a swinging head restraint, the swinging movement of which is aided by a pneumatic spring;

FIG. 4 shows another head restraint variant, the rear of which is designed as a cover; and FIG. 5 shows a bearing arm arrangement, designed in the manner of a parallelogram, by means of which a head restraint pivoting in the opposite direction to the swing of the bearing arms during a swinging movement, is achieved.

Figure 1:
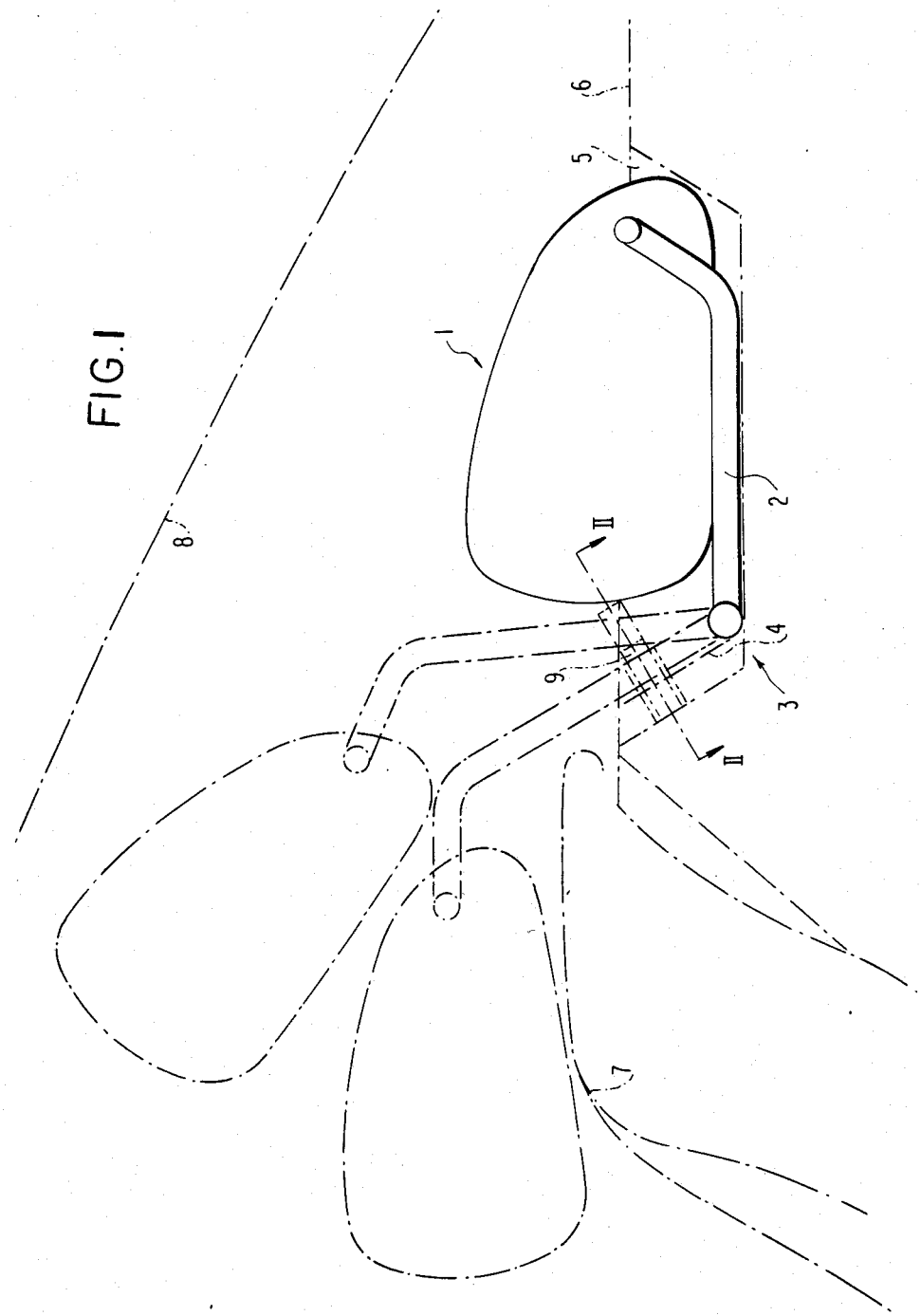
FIG. 1 shows a head restraint which can be swung from a stowage position, shown in solid lines, into two, locked positions for use, shown in broken lines.

Referring now to the figures in which like reference numerals designate like elements and, in particular, to FIG. 1, a head restraint 1 is supported via articulated bearing arms 2, of which only one is illustrated, on a solid vehicle part 3, represented by broken lines. This part takes the form of an inside wall 4 of a hollow 5 which, in a way not shown, is designed as a separate component which can be fitted into a rear window shelf 6 of a motor car.

From the not-in-operation position, resented by solid lines, in which at least part of the head restraint 1 is received by the hollow 5, the head restraint 1 can be transferred into a forwardmost operating position, indicated by broken lines, in which the head restraint 1 directly adjoins the rear backrest 7 by rotation of bearing arms about pivot 2'. Before reaching this operating position, the head restraint 1 is pivoted about pivot 2" in the opposite direction to the swing of the bearing arm 2 about 2', it being possible, due to the initially small effective lever arm, to install the pre-assembled, operational unit even in motor cars having a flatly extending rear window 8.

If the front operating position is reached, a mechanism 9, shown in more detail in FIG. 2, a section along II—II of FIG. 1, which automatically interlocks one of the bearing arms 2 comes into operation. The mechanism 9 consists of a link plate 11 articulated with a base plate 10 and accommodating a spring-loaded bearing arm interlock 12 and being guided at its free end 13 in a slot 14 in the baseplate 10 fixed to the inside wall 4, with the free end 13 being pressed against the link plate 11 under pre-tension in order to maintain a braked movement sequence. This makes it possible for the head restraint 1 to be transferred from the forwardmost in-use position into the rear position for use, likewise shown in FIG. 1 by broken lines, without intermediate stages and retaining the interlock of the bearing arm 2.

If the head restraint 1 is to be transferred from an in-use position back into the not-in-use position, the bearing arm interlock 12 is pulled to the right against the effective spring force by means of a remote control 15 shown in FIG. 2, until the associated bearing arm 2 is freely pivotable again. Together with the swinging movement of the bearing arms 2, which is to be performed in a clockwise direction, the head restraint 1 can be pivoted counterclockwise, so that at the end of the swinging operation the stowage position, shown in solid lines in FIG. 1, is reached again.

In contrast to the representation of FIG. 1, FIG. 3 illustrates that a power-assisted mechanism 16, in the form of a pneumatic spring 17 fixed to the vehicle, engages at least one bearing arm 2 and is used to aid the swinging movement directed towards and is arranged in such a way that, in the not-in-operation position, it assumes a beyond-dead-center position shown in dotted lines at 25, preventing the head restraint 1 from making a noise. This position can be cancelled and restored by means of a remote control (not shown) transmitting tensile and compressive forces The pneumatic spring 17 can, in this case, be designed in such a way that, upon a head impact, a backward displacement of the head restraint 1 occurs, with energy absorption. Furthermore, when using lockable pneumatic springs, it is possible to move into various operating positions, ensuring optimum comfort.

The head restraint 1 shown in FIG. 4 and arranged in accordance with FIG. 1 is provided with a basic head restraint element 18, which has a stop 19 for each associated bearing arm 2, so that, upon head impact, starting from the rear in-use position illustrated, the restraint only swings about the pivot points on the inside wall 4 until the head restraint is supported by the nearby rear window 8, as indicated. The rear 20 of the head restraint 1 is designed as a cover 21, so that, in the stowage position, an elegant cover of the head restraint 1, matching the surroundings, is achieved.

FIG. 5 illustrates a possible way of pivoting a head restraint 1 during transfer from the not-in-operation position into the position for use or vice versa, relative to the swinging movement of the bearing arms 2. In this case, each bearing arm 2 consists of a pair of bearing arms 2a and 2b each of semi-circular cross section as shown at 2c and pivotable about pivots 2' and 2''', respectively. Restraint element 1 is also pivoted to arms 2a and 2b at 2'''' and 2'', respectively. As pivoting takes place about 2', 2'', 2''' and 2'''', the pivots assume successive positions, the pivots in each position arranged in the manner of a parallelogram, so that, during a swinging movement of the head restraint 1, they assume the intermediate positions illustrated. By this expedient, the head restraint 1 maintains a constant angular orientation with respect to the vehicle part 3. In the position for use, the head restraint 1 can be locked in a way already described or, upon head impact, pivoted with energy absorption, e.g., by the use of friction elements at the pivot points While we have shown and described only one embodiment in accordance with the present invention, it is understood that the same is not limited thereto but is susceptible to numerous changes and modifications as known to one having ordinary skill in the art, and we therefore do not wish to be limited to the details shown and described herein, but intend to cover all such modifications as are encompassed by the scope of the appended claims.

We claim:

1. A head restraint apparatus for a vehicle, wherein a head restraint is supported by means of at least one bearing arm engaging a solid part of the vehicle and which, together with the at least one bearing arm, can be transferred from an in-use position into a stowage position in which the head restraint is received by a hollow member in the rear window shelf, comprising an inside wall means of the hollow member serving as a solid part of the vehicle for supporting the at least one bearing arm, and means for pivoting the head restraint before, during or after conclusion of a swinging operation, in the opposite direction to the swing of the at least one bearing arm.

2. A head restraint apparatus according to claim 1, wherein the hollow member comprises a separate component, connectable to the rear window shelf.

3. A head restraint apparatus according to claim 1, comprising means for inducing an automatic interlocking of at least one bearing arm when a position for use is reached.

4. A head restraint apparatus according to claim 3, further comprising
link plate means for pivoting the head restraint in a direction counter to the swinging motion, and
slot means, pivoted and accommodating a bearing arm interlock for guiding the movement of the head restraint.

5. A head restraint apparatus according to claim 1, further comprising
a head restraint element having a stop means for restricting the pivoting movement counter to the swinging movement of the head restraint relative to the at least one bearing arm.

6. A head restraint apparatus according to claim 5, further comprising
rear window means for supporting the head restraint in the event of movement by the restraint element due to an accident.

7. A head restraint apparatus according to claim 1, wherein the head restraint comprises a cover closing off the hollow member.

8. A head restraint apparatus according to claim 1, comprising
a power-assisted means comprising a pneumatic spring means for assisting swinging movement of the head restraint.

9. A head restraint apparatus according to claim 1, comprising
plural bearing arms and
means pivoting the bearing arms articulated in pairs to assume positions in the manner of a parallelogram.

10. A head restraint apparatus for a vehicle, wherein a head restraint is supported by means of at least one bearing arm engaging a solid part of the vehicle and which, together with the at least one bearing arm, can be transferred from an in-use position into a stowage position in which the head restraint is received by a hollow member in the rear window shelf, comprising an inside wall means of the hollow member serving as a solid part of the vehicle for supporting the at least one bearing arm, and means for pivoting the head restraint before, during or after conclusion of a swinging operation, in the opposite direction to the wing of the at least one bearing arm, a power-assisted means comprising a pneumatic spring means for assisting swinging movement of the head restraint, when the not-in-use position of the head restraint is reached, the pneumatic spring means assumes a beyond-dead-center position and remote control means for controlling the position of the pneumatic spring means.

* * * * *